(12) United States Patent
Wu et al.

(10) Patent No.: US 11,774,700 B2
(45) Date of Patent: Oct. 3, 2023

(54) DRIVING MODULE

(71) Applicant: TDK TAIWAN CORP., Taoyuan (TW)

(72) Inventors: Fu-Yuan Wu, Taoyuan (TW); Yu-Shan Chou, Taoyuan (TW); Haruo Taguchi, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/578,784

(22) Filed: Jan. 19, 2022

(65) Prior Publication Data

US 2022/0137319 A1 May 5, 2022

Related U.S. Application Data

(63) Continuation of application No. 16/502,709, filed on Jul. 3, 2019, now Pat. No. 11,256,059, which is a (Continued)

(30) Foreign Application Priority Data

Nov. 13, 2017 (CN) .......................... 201711116584.9

(51) Int. Cl.
*G02B 7/02* (2021.01)
*G02B 7/08* (2021.01)
(Continued)

(52) U.S. Cl.
CPC ............... *G02B 7/023* (2013.01); *G02B 7/08* (2013.01); *G02B 27/646* (2013.01); *G03B 5/04* (2013.01);
(Continued)

(58) Field of Classification Search
CPC ........ G02B 7/023; G02B 7/08; G02B 27/646; G02B 7/09; G02B 27/648; G02B 7/026;
(Continued)

(56) References Cited

U.S. PATENT DOCUMENTS 11,256,059 B2 * 2/2022 Wu .......................... G02B 7/08
2008/0239270 A1 10/2008 Bischoff et al.
(Continued)

FOREIGN PATENT DOCUMENTS

CN 2757156 Y 2/2006
CN 106133594 A 11/2016
TW I578094 B 4/2017

OTHER PUBLICATIONS

Office Action of CN Application No. 201711116584.9, dated Aug. 10, 2021, 9 pages.
(Continued)

*Primary Examiner* — Mohammed A Hasan
(74) *Attorney, Agent, or Firm* — MUNCY, GEISSLER, OLDS & LOWE, P.C.

(57) ABSTRACT

A driving module is provided. The driving module includes a fixed portion, a movable portion movably connected to the fixed portion and used to hold an optical element having an optical axis, a driving assembly for driving the movable portion to move relative to the fixed portion, and a circuit assembly electrically connected to the driving assembly. The circuit assembly includes a first segment, a second segment, and a third segment. The first segment is resilient, plate-shaped, and movable relative to the fixed portion and the movable portion. The second segment is plate-shaped and affixed on the movable portion, wherein a thickness direction of the first segment is different from a thickness direction of the second segment. The third segment is plate-shaped and affixed on the fixed portion, wherein the second segment is movably connected to the third segment through the first segment.

20 Claims, 8 Drawing Sheets

Related U.S. Application Data continuation of application No. 15/868,508, filed on Jan. 11, 2018, now Pat. No. 10,386,595.

(60) Provisional application No. 62/450,198, filed on Jan. 25, 2017.

(51) Int. Cl.
*G02B 27/64* (2006.01)
*G03B 5/04* (2021.01)
*G02B 7/09* (2021.01)

(52) U.S. Cl.
CPC ........ *G02B 7/09* (2013.01); *G03B 2205/0015* (2013.01); *G03B 2205/0069* (2013.01)

(58) Field of Classification Search
CPC .............. G03B 5/04; G03B 2205/0015; G03B 2205/0069; G03B 3/10; G03B 5/02; G03B 30/00
USPC ........................................................ 359/822
See application file for complete search history.

(56) References Cited

U.S. PATENT DOCUMENTS

| | | | |
|---|---|---|---|
| 2010/0091120 A1 | 4/2010 | Nagata et al. | |
| 2018/0335602 A1* | 11/2018 | Hu | G02B 7/09 |
| 2019/0324225 A1* | 10/2019 | Wu | G03B 3/10 |
| 2020/0068055 A1 | 2/2020 | Hu et al. | |

OTHER PUBLICATIONS

Office Action of CN Application No. 201711116584.9, dated Nov. 4, 2020, 4 pages.

\* cited by examiner

DRIVING MODULE

CROSS-REFERENCE TO RELATED APPLICATIONS

This application is a Continuation application of U.S. patent application Ser. No. 16/502,709, filed on Jul. 3, 2019, which claims the priority of U.S. patent application Ser. No. 15/868,508, filed on Jan. 11, 2018, which claims priority of U.S. Provisional Patent Application No. 62/450,198, filed on Jan. 25, 2017, and China Patent Application No. 201711116584.9 filed on Nov. 13, 2017, which are incorporated by reference herein in their entirety.

BACKGROUND OF THE INVENTION

Field of the Invention

The present invention relates to a driving module.

Description of the Related Art

Conventional cameras, video recorders and mobile phones can often collide with other objects or be otherwise impacted by external forces. As a result, the inner optical system of such a device may vibrate, resulting in the image that is captured coming out blurry. Patent document TW 1578094 discloses an optical image stabilization device, wherein its inner coil may interact with a corresponding magnet after passing a current, which allows the lens holder secured to the coil to move along the optical axis of the lens and along a horizontal direction that is perpendicular to the direction of the optical axis. This achieves auto focus (AF) and optical image stabilization (OIS) functionality, and can lead to better image quality. As shown in FIG. 1, in a conventional optical image stabilization device, a lens is disposed in a lens holder 100, the lens holder 100 is movably disposed in the frame 200, wherein the frame 200 and the substrate 300 below the frame 200 extend along a vertical direction (Z axis direction) and are connected by a resilient suspension wire 400. However, this may make it hard to reduce the dimensions of the mechanism along the Z axis, which is a disadvantage to the goal of miniaturizing such products.

BRIEF SUMMARY OF THE INVENTION

A driving module is provided. The driving module includes a fixed portion, a movable portion movably connected to the fixed portion and used to hold an optical element having an optical axis, a driving assembly for driving the movable portion to move relative to the fixed portion, and a circuit assembly electrically connected to the driving assembly. The circuit assembly includes a first segment, a second segment, and a third segment. The first segment is resilient, plate-shaped, and movable relative to the fixed portion and the movable portion. The second segment is plate-shaped and affixed on the movable portion, wherein a thickness direction of the first segment is different from a thickness direction of the second segment. The third segment is plate-shaped and affixed on the fixed portion, wherein the second segment is movably connected to the third segment through the first segment.

DETAILED DESCRIPTION OF THE INVENTION

Hereinafter, the embodiment of present invention will be described hereinafter with attached figures.

The abovementioned and other technical contents, features and effects relating to the present invention are clearly shown in the description of a preferred embodiment with reference figures. The directional phrases, such as on, under, left, right, front or rear are the directions relative to the reference figures. As a result, the directional phrases are only for illustration and is not intended to restrict this invention.

Figure 1:
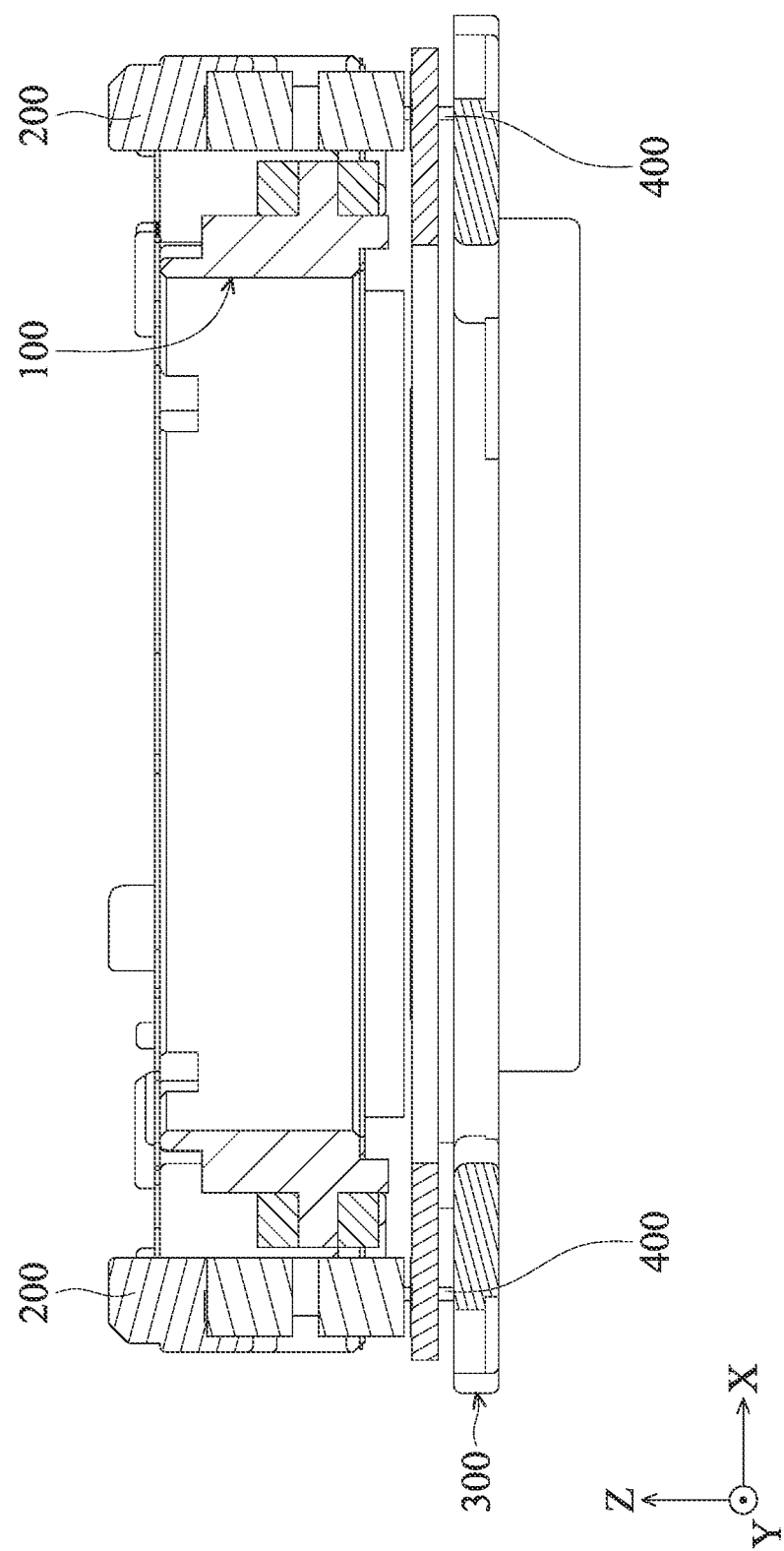
FIG. 1 is a cross-sectional view of a conventional support mechanism.
Figure 2A:
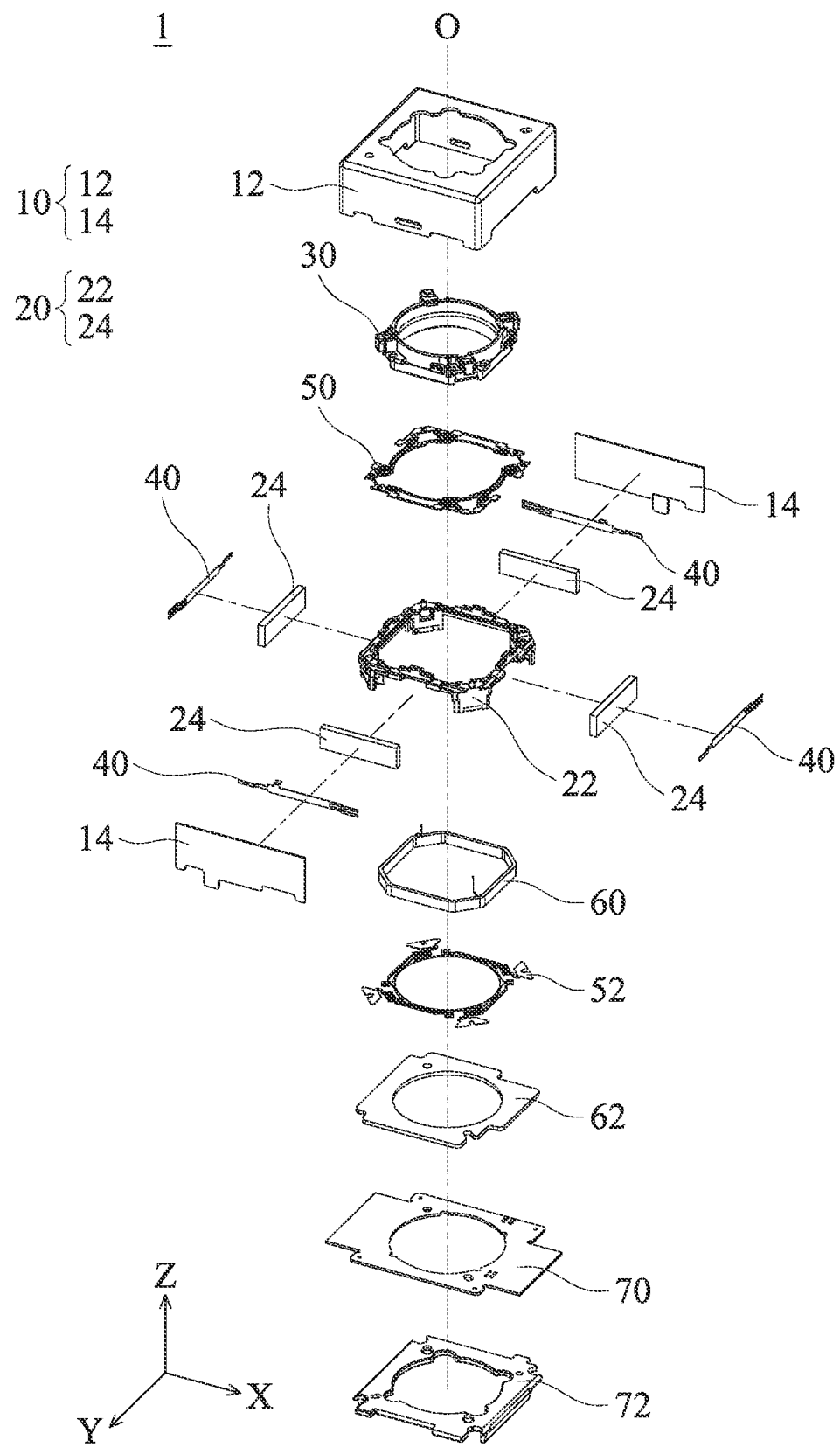
FIG. 2A is an exploded view of a support mechanism, according to an embodiment of the present invention.
Figure 2B:
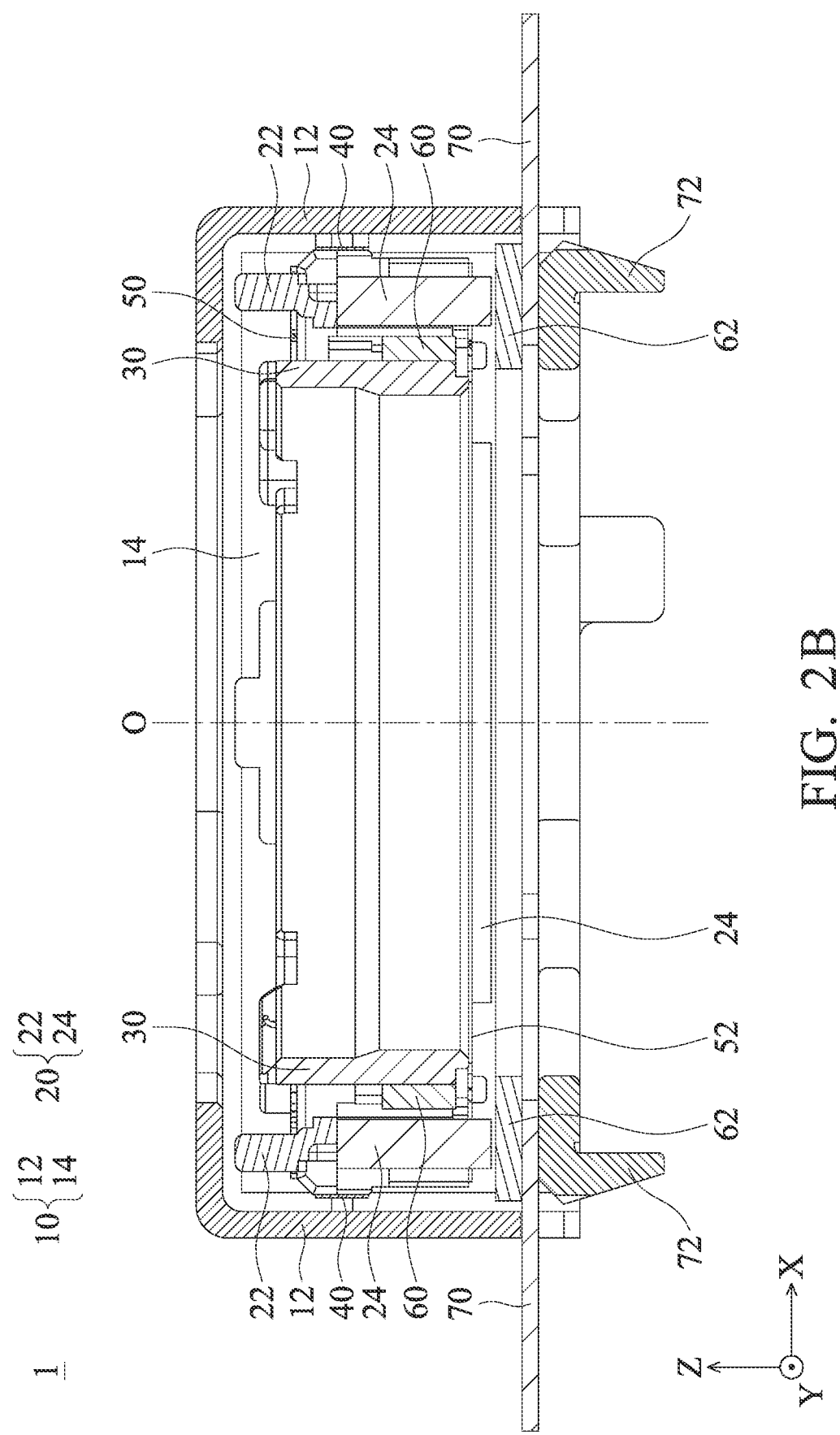
FIG. 2B is a cross-sectional view of the support mechanism in FIG. 2A after combining.
Figure 2C:
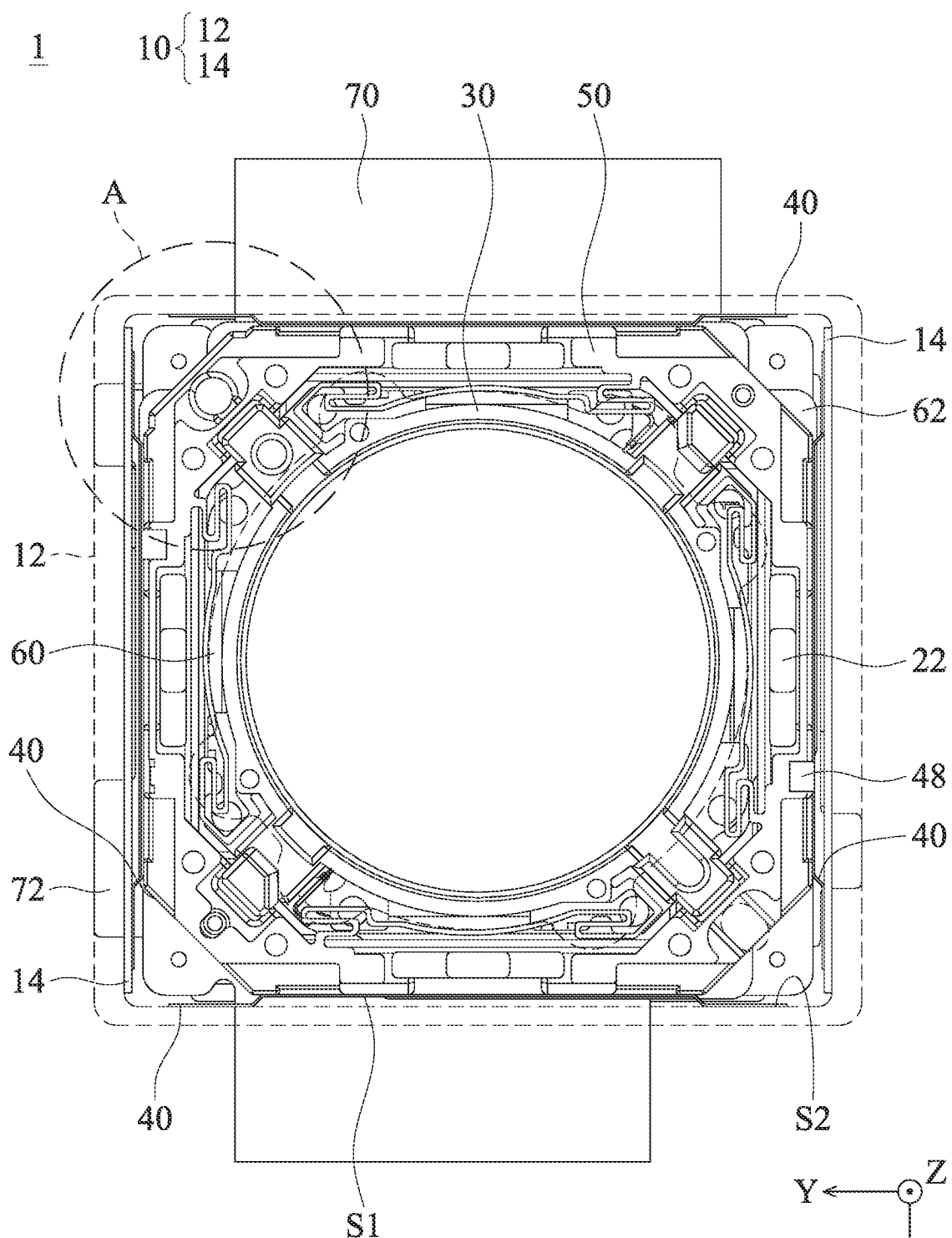
FIG. 2C is a top view of the support mechanism in FIG. 1 after combining and removing the case.

Referring to FIGS. 2A-2C. In an embodiment of the present invention, a lens support mechanism 1 may be disposed, for example, in a camera (or an electronic device with photographing function) to hold a lens, and it may be used to prevent or to suppress the problem of the image captured blurring caused from the camera vibration. It can be figured out from FIGS. 2A-2C that the support mechanism 1 mainly includes a case 12, at least a conductive element 14, a frame 22, at least a magnetic element 24, a lens holder 30, at least a resilient element 40, a first spring 50, a second spring 52, a first driving mechanism 60, a second driving mechanism 62, a circuit unit 70 and a base 72, wherein the case 12 and the conductive element 14 are fixed to each other to form a fixed module 10, and the frame 22 and the magnetic element 24 form a movable module 20 which may move relative to the fixed module 10. It should be noted that an image sensor (e.g. CCD, not shown) is disposed under the base 27, and a lens (not shown) corresponding to the image sensor is disposed in the lens holder 30. Coils corresponding to the magnetic elements 24 are disposed in the second driving element 62 to move the lens holder 30 and the lens therein by magnetic force to instantly correct the offset of the lens along X axis direction or Y axis direction, and thus achieving optical image stabilization and acquiring better image quality. Furthermore, the magnetic elements 24 may be shielded by other elements when viewed from top in this embodiment, so they are not shown in FIG. 2C.

Figure 2D:
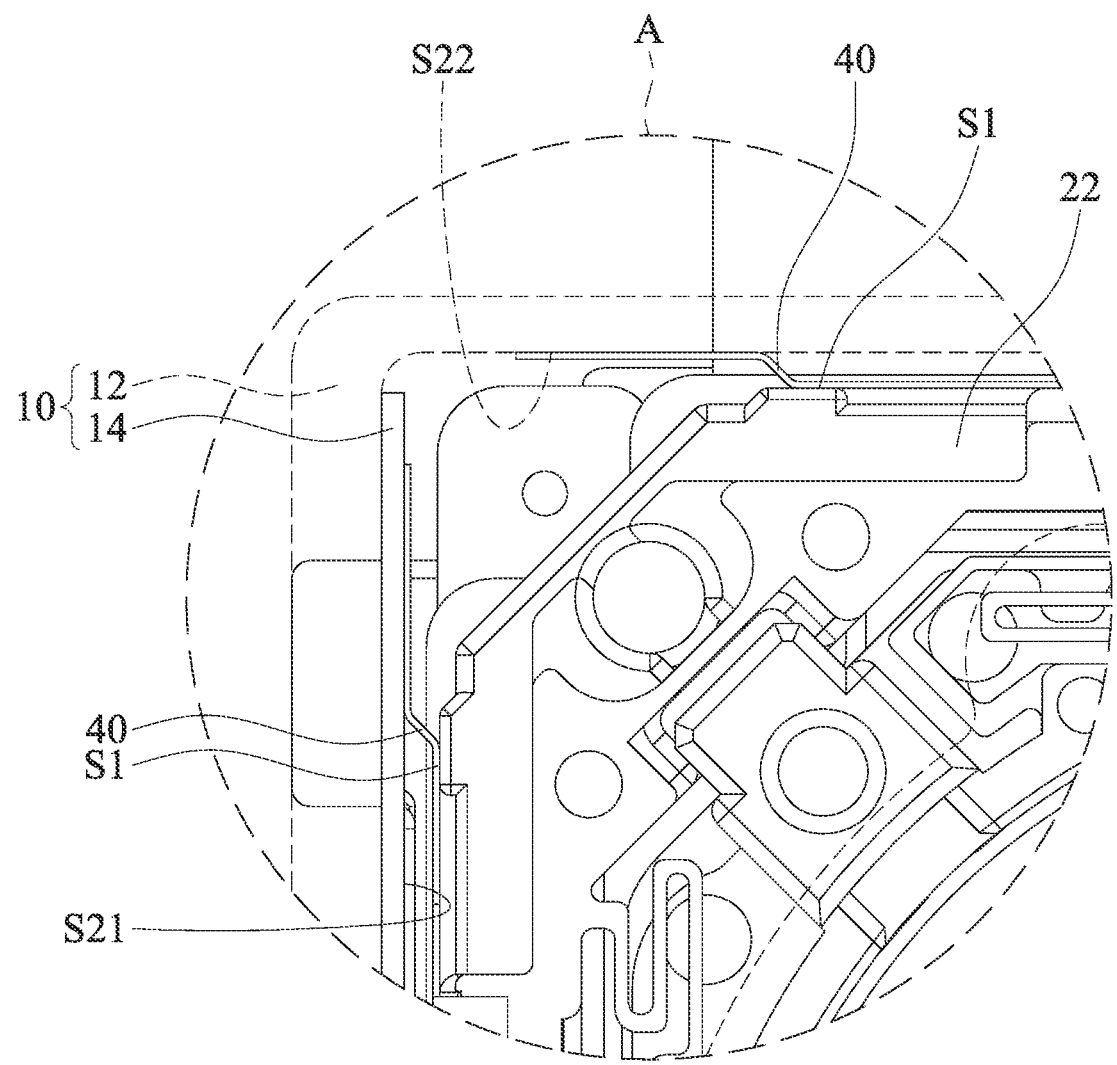
FIG. 2D is an enlarged view of the marked portion A in FIG. 2C.

As shown in FIGS. 2B-2C, the movable module 20 is movably disposed in the fixed module 10, and the lens holder 30 is movably disposed in the movable module 20 for holding the lens. It can be figured out from FIGS. 2C-2D that the resilient elements 40 at left and right sides are respectively connected to the outer surface S1 of the frame 22 and the inner surface S21 of the conductive element 14 along Y axis, and the outer surface S1 faces the inner surface S21. Furthermore, the resilient elements 40 at top and bottom sides are respectively connected to the outer surface S1 of the frame 22 and the inner surface S21 of the conductive element 14 along X axis. In other words, the resilient elements 40 only have to be connected to any outer surface of the movable module 20 (frame 22 or magnetic element 24) and any inner surface of the fixed module 10 (case 12 or conductive element 14), and is not limited by the embodiments of FIGS. 2B-2D. In this embodiment, the resilient element 40 is connected to the fixed module 10 and the movable module 20 to move the lens holder 30 and the lens disposed therein along the horizontal direction (i.e. X axis direction or Y axis direction) relative to the case 12 and the base 72 to perform optical image stabilization. No suspension wire is required to be disposed in this embodiment, so the height of the image capturing module along Z axis may be significantly reduced to meet the requirement of miniaturization of the electronic devices.

Figure 3:
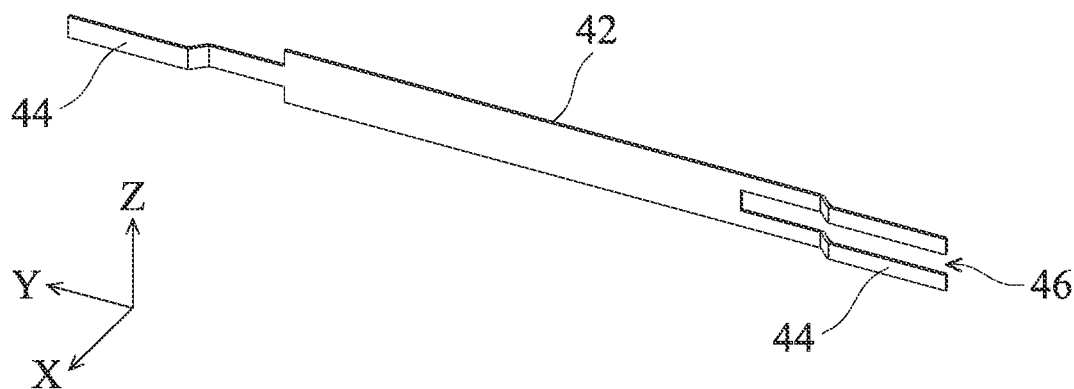
FIG. 3 is a schematic view of the resilient element in FIG. 2A.

FIG. 3 is a schematic view of the resilient element 40 in FIG. 2A. The resilient element 40 includes a first connecting surface 42 and at least a second connecting surface 44, wherein the first connecting surface 42 may be fixed on the outer surface S1 of the movable module 20 (e.g. the outer surface of the frame 22 or the magnetic element 24), the second connecting surface 44 may be fixed on the inner surface S2 of the fixed module 10 (e.g. the inner surface of the case 12 or the conductive element 14), and the first connecting surface 42 and the second connecting surface 44 are not perpendicular to optical axis O. In an embodiment, the first connecting surface 42 and the second connecting surface 44 are parallel to the optical axis O, but is not limited thereto. In this embodiment, the resilient element 40 is connected to the fixed module 10 and the movable module 20 in a surface contact manner, the connecting method may be welding or adhesion, but is not limited thereto. As a result, the movable module 20 may move along the horizontal direction (i.e. X axis direction or Y axis direction) relative to the fixed module 10 to perform the horizontal offset correction of the lens along X axis and Y axis directions. In this embodiment, the resilient element 40 is used as the connecting structure, wherein conventional connecting way is using suspension wire, so the lens may have less chance to tilt with respect to the Z axis direction.

Still referring to FIG. 3, the resilient element 40 substantially has an longitudinal shape and forms a U-shaped structure 46. The U-shaped structure 46 may increase contact area between the resilient element 40 and the fixed module 10/the movable module 20 to enhance the stability of the support mechanism 1. In an embodiment, the resilient element 40 may be a spring sheet and may be formed by metal sheet stamping, but is not limited thereto.

Figure 4:
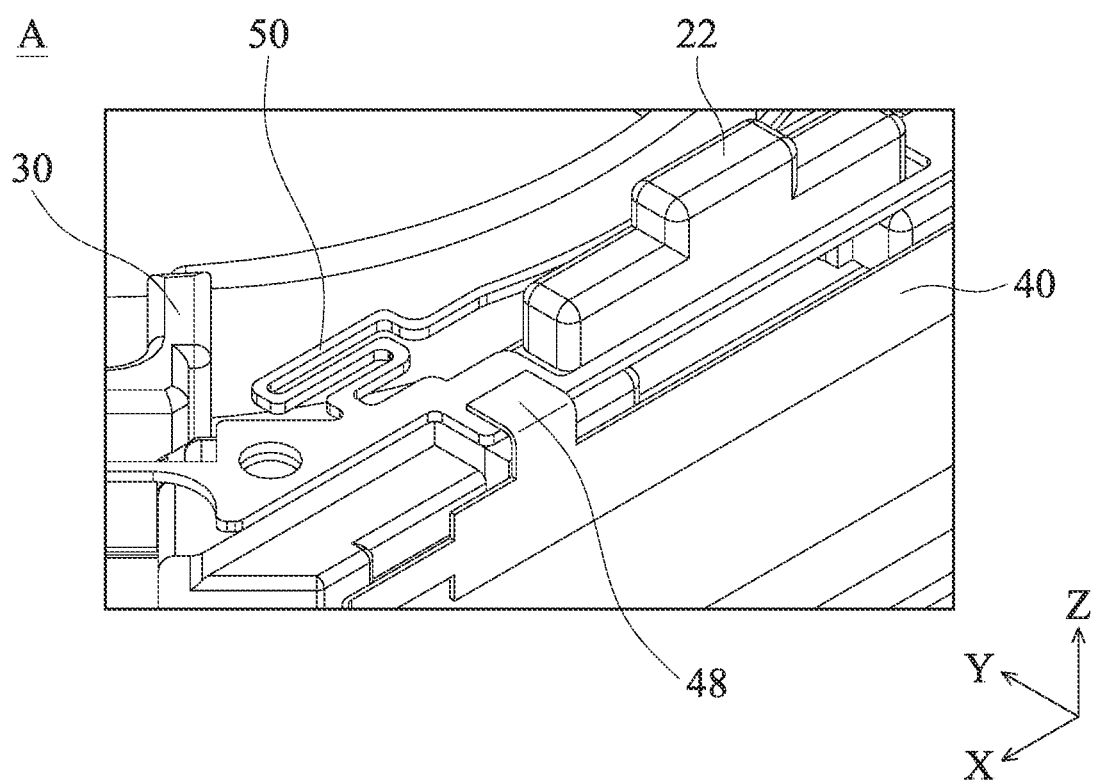
FIG. 4 is a schematic view of the resilient element electrically connecting to the spring, according to an embodiment of the present invention.

Referring to FIGS. 2A-2C and 4, the circuit unit 70 may provide current to the first driving element 60 and the second driving element 62 to perform auto focus and optical image stabilization functions, wherein the resilient element 40 may be electrically connected to the circuit unit 70 through the conductive element 14. As shown in FIG. 4, the resilient element 40 includes a bent portion 48 extended upward from sidewall of the frame 22 and bent toward the inner side of the frame 22, and thus electrically connects to a top surface of the first spring 50. As a result, the contact area of the resilient element 40 and the first spring 50 may be increased, so their bonding strength may be enhanced.

Figure 5:
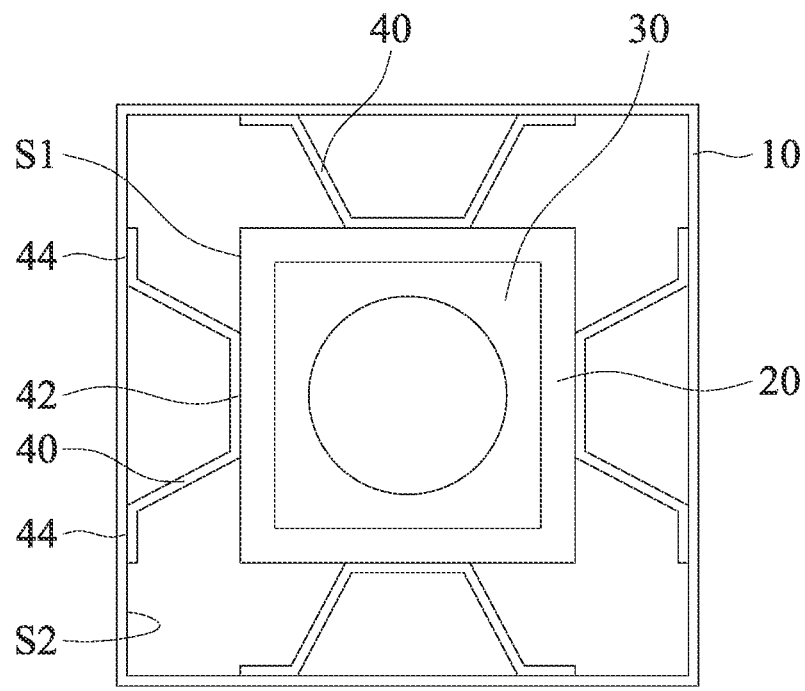
FIG. 5 is a schematic view of the resilient element connecting to the fixed module and the movable module, according to an embodiment of the present invention.

Referring to FIG. 5, which is a schematic view of the connection of the resilient element 40 and the fixed module 10 (e.g. the case 12 or conductive element 14 in FIG. 2B) and the movable module 20 (e.g. the frame 22 or magnetic element 24 in FIG. 2B), wherein the lens holder 30 is movably disposed in the movable module 20 for holding the lens. In this embodiment, the four resilient elements 40 are respectively connected to different sides of the fixed module 10 and the movable module 20. Furthermore, it can be figured out from FIG. 5 that the resilient element 40 includes a plurality of second connecting surfaces 44, wherein the first connecting surface 42 is between the second connecting surfaces 44, the first connecting surface 42 is connected to the center position of the outer surface S1 of the movable module 20, and the second connecting surface 44 is connected to the inner surface S2 of the fixed module 10. It should be noted that only two resilient elements 40 are respectively connected to the fixed module 10 and the movable module 20 in some embodiments, wherein the two resilient elements 40 are respectively at different sides of the movable module 20 and perpendicular to each other, but is not limited thereto.

Figure 6:
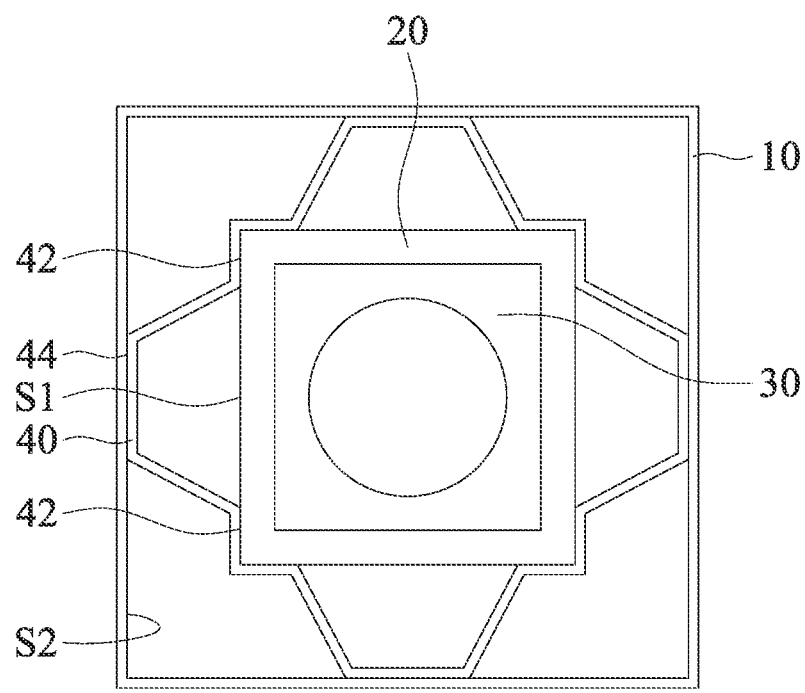
FIG. 6 is a schematic view of the resilient element connecting to the fixed module and the movable module, according to another embodiment of the present invention.

However, different types of resilient elements 40 may be used to connect the movable module 20 (e.g. the frame 22 or the magnetic element 24 in FIG. 2B) and the fixed module 10 (e.g. the case 12 or the conductive element 14 in FIG. 2B). As shown in FIG. 6, the resilient element 40 has a plurality of the first connecting surfaces 42 in this embodiment, wherein the second connecting surface 44 is between the two first connecting surfaces 42, each of the first connecting surface 42 of the resilient element 40 is connected to two opposite ends of the outer surface S1 of the movable module 20, and the second connecting surfaces 44 are connected to the inner surface S2 of the fixed module 10. In this embodiment, the movable module 20 and the fixed module 10 are connected by the resilient element 40, so no suspension wire is required, and thus the thickness of the image capturing module is reduced to meet the requirement of miniaturization of the electronic devices.

Figure 7:
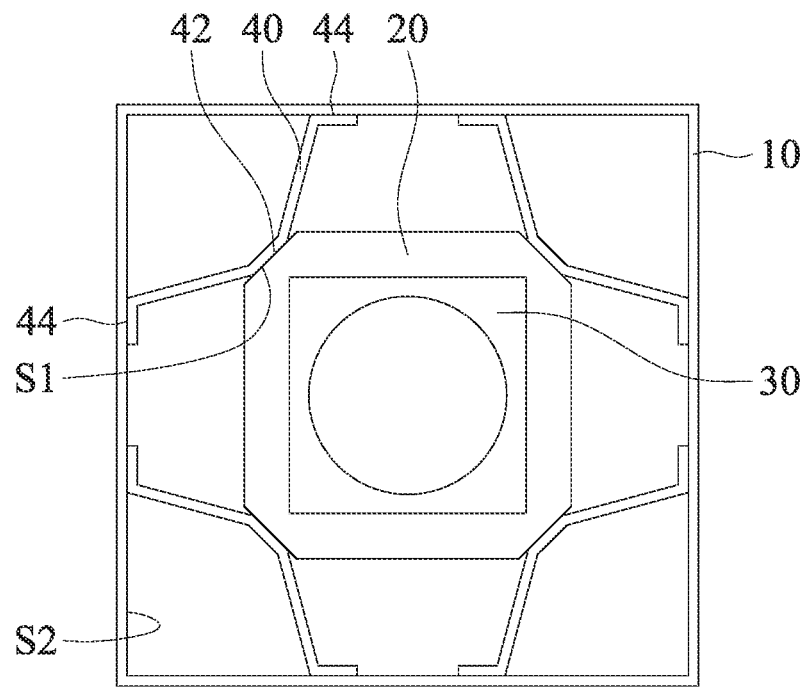
FIG. 7 is a schematic view of the resilient element connecting to the fixed module and the movable module, according to another embodiment of the present invention.

Referring to FIG. 7, which is a schematic view of the connection between the resilient element 40 and the fixed module 10 (e.g. the case 12 or conductive element 14 in FIG. 2B) and the movable module 20 (e.g. the frame 22 or magnetic element 24 in FIG. 2B), according to another embodiment of the present invention. The movable module 20 is movably disposed in the fixed module 10, wherein the movable module 20 substantially has a quadrilateral structure, and the lens holder 30 is movably disposed in the movable module 20 for holding a lens. It can be figured out from FIG. 7 that the resilient element 40 is connected to an outer surface S1 of the movable module 20 and an inner surface S2 of the fixed module 10, wherein the outer surface S1 is at a corner of the quadrilateral structure. In this embodiment, the resilient element 40 is disposed at the corner of the movable module 20, so the space at the corner of the movable module 20 may be fully utilized to miniature the volume of the image capturing module.

Referring to FIG. 7, the resilient element 40 includes a first connecting surface 42 and a plurality of second connecting surfaces 44, wherein the first connecting surface 42 is fixed on the outer surface S1 of the movable module 20, and the second connecting surfaces are fixed on the inner surface S2 of the fixed module 10. It should be noted that the first connecting surface 42 is not parallel to the second connecting surfaces 44, and the first connecting surface 42 is between the second connecting surfaces 44.

Figure 8:
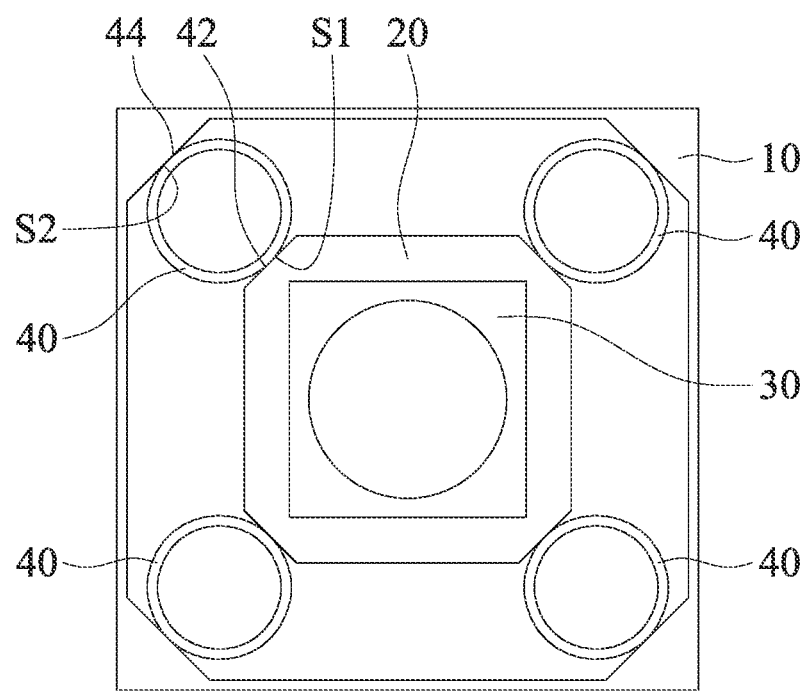
FIG. 8 is a schematic view of the resilient element connecting to the fixed module and the movable module, according to another embodiment of the present invention.

On the other hand, as shown in FIG. 8, the resilient element 40 may also has a circular structure to connect the movable module 20 (e.g. the frame 22 or the magnetic element 24 in FIG. 2B) with the fixed module 10 (e.g. the case 12 or the conductive element 14 in FIG. 2B), wherein the lens holder 30 is movably disposed in the movable module 20 for holding a lens. As a result, the lens may move along the horizontal direction (X axis direction or Y axis direction) relative to the fixed module 10.

In every embodiment of the present invention, the movable module 20 and the fixed module 10 are connected by the resilient element 40, so a conventional suspension wire is not required. As a result, it is harder to tilt the lens with respect to the Z axis direction, and the height of the image capturing module along the Z axis may be significantly reduced, meeting the requirement to miniaturize the electronic device.

The descriptions above are only embodiments of the present the disclosure, and should not be used to limit the present disclosure. For a person skilled in the art, various changes and variations may be included in the present disclosure. The features of the embodiments may be used together and depend on the requirements, and is not limited. Any variation, equivalent replacement and improvement in the spirit and principle of the present disclosure should be protected in the present disclosure.

What is claimed is:

1. A driving module, comprising:
   a fixed portion;
   a movable portion movably connected to the fixed portion and used to hold an optical element having an optical axis;
   a driving assembly for driving the movable portion to move relative to the fixed portion; and
   a circuit assembly electrically connected to the driving assembly, wherein the circuit assembly comprises:
      a first segment being resilient, plate-shaped, and movable relative to the fixed portion and the movable portion;
      a second segment being plate-shaped and affixed on the movable portion, wherein a thickness direction of the first segment is different from a thickness direction of the second segment; and
      a third segment being plate-shaped and affixed on the fixed portion, wherein the second segment is movably connected to the third segment through the first segment.

2. The driving module as claimed in claim 1, wherein the fixed portion comprises a first connecting surface connected to the third segment, the movable portion comprises a second connecting surface connected to the second segment, and the first connecting surface, the second connecting surface, and the first segment are positioned at corners of the driving module.

3. The driving module as claimed in claim 1, wherein the first segment at least partially overlaps the driving assembly when viewed in a direction that is perpendicular to the optical axis.

4. The driving module as claimed in claim 1, wherein the first segment does not overlap the movable portion when viewed along the optical axis.

5. The driving module as claimed in claim 1, wherein the second segment does not overlap the third segment when viewed in a tangent direction parallel to the second segment.

6. The driving module as claimed in claim 5, wherein the second segment and the third segment are parallel.

7. The driving module as claimed in claim 1, wherein the circuit assembly further comprises a bent portion connected to the second segment, and the bent portion and the second segment extend in different directions.

8. The driving module as claimed in claim 7, wherein the bent portion at least partially overlaps the movable portion when viewed along the optical axis.

9. The driving module as claimed in claim 7, wherein the bent portion and the first segment extend in different directions.

10. The driving module as claimed in claim 7, further comprising a first spring disposed on the movable portion and the fixed portion, wherein the being portion is in contact with the first spring.

11. The driving module as claimed in claim 1, wherein the fixed portion comprises a conductive element and a case, wherein the third segment is in contact with the conductive element and separated from the case.

12. The driving module as claimed in claim 11, wherein the conductive element is plate-shaped, and normal directions of the conductive element and the third segment are parallel.

13. The driving module as claimed in claim 11, wherein the size of the conductive element in a first direction that the third segment extends is greater than the size of the conductive element in the first direction.

14. The driving module as claimed in claim 1, wherein the circuit assembly further comprises:
   a fourth segment being resilient, plate-shaped, and movable relative to the fixed portion and the movable portion; and
   a fifth segment being plate-shaped and affixed on the fixed portion, wherein the second segment is movably connected to the fifth segment through the fourth segment.

15. The driving module as claimed in claim 14, wherein the fourth segment comprises a first sub-segment and a second sub-segment connected to the second segment, the fifth segment comprises a third sub-segment and a fourth sub-segment, wherein the third sub-segment connects to the first sub-segment, and the fourth sub-segment connects to the second sub-segment.

16. The driving module as claimed in claim 15, wherein the first sub-segment and the second sub-segment are separated from each other, and the third sub-segment and the fourth sub-segment are separated from each other.

17. The driving module as claimed in claim 14, wherein the second segment comprises a main portion and a first connecting portion, the main portion is connected to the first segment through the first connecting portion, and the width of the first connecting portion is less than the width of the main portion.

18. The driving module as claimed in claim 17, wherein the second segment further comprises a second connecting portion and a third connecting portion connected to the main portion, wherein the second connecting portion connects to the first sub-segment, and the third connecting portion connects to the segment sub-segment.

19. The driving module as claimed in claim 18, wherein the distance between the first sub-segment and the second sub-segment is less than the width of the main portion.

20. The driving module as claimed in claim 18, the distance between the first sub-segment and the second sub-segment equals to the distance between the second connecting portion and the third connecting portion.

\* \* \* \* \*